US009650130B2

(12) United States Patent
Bouzmane

(10) Patent No.: US 9,650,130 B2
(45) Date of Patent: May 16, 2017

(54) ELECTRIC HYDRAULIC MOTOR SYSTEM FOR AIRCRAFT

(71) Applicant: Mohammed Bouzmane, Columbus, OH (US)

(72) Inventor: Mohammed Bouzmane, Columbus, OH (US)

( * ) Notice: Subject to any disclaimer, the term of this patent is extended or adjusted under 35 U.S.C. 154(b) by 125 days.

(21) Appl. No.: 14/662,052

(22) Filed: Mar. 18, 2015

(65) Prior Publication Data

US 2015/0266567 A1 Sep. 24, 2015

Related U.S. Application Data

(60) Provisional application No. 61/969,413, filed on Mar. 24, 2014.

(51) Int. Cl.
*B64C 25/40* (2006.01)

(52) U.S. Cl.
CPC .......... *B64C 25/405* (2013.01); *Y02T 50/823* (2013.01)

(58) Field of Classification Search
CPC ....... B64C 25/405; B64C 25/42; B64C 25/44; B64C 25/46; B64C 25/48; B64C 25/446
See application file for complete search history.

(56) References Cited

U.S. PATENT DOCUMENTS

| 3,807,664 | A | * | 4/1974 | Kelly, Jr. | B64C 25/405 180/302 |
| 3,874,619 | A | * | 4/1975 | Collins | B64C 25/405 180/7.1 |
| 6,193,326 | B1 | * | 2/2001 | Ybert | B60T 8/00 303/126 |
| 6,663,192 | B2 | * | 12/2003 | Bourguet | B60T 8/1703 303/14 |
| 2006/0038068 | A1 | * | 2/2006 | Sullivan | B60L 7/26 244/111 |
| 2006/0260323 | A1 | * | 11/2006 | Moulebhar | F01D 21/003 60/793 |
| 2009/0294577 | A1 | * | 12/2009 | Roques | B64C 25/40 244/50 |
| 2011/0303785 | A1 | * | 12/2011 | Delloue | B64C 25/405 244/50 |

(Continued)

*Primary Examiner* — Justin Benedik
(74) *Attorney, Agent, or Firm* — Bryce D. Miracle; Miracle IP

(57) ABSTRACT

An electric hydraulic motor system for aircraft having a taxing and takeoff mode and a braking mode. While in the taxiing and takeoff mode, a battery and optionally other sources of energy stored within the aircraft together provide energy to drive an electric motor which in turn drives a hydraulic pump creating hydraulic pressure within the aircraft hydraulic system. The increase in hydraulic pressure within the system actuates a hydraulic motor connected to the aircraft wheels, thereby providing rotation to the wheels of the aircraft, moving the aircraft forward. Alternatively, while in the braking mode, the rotation of the wheels of the aircraft drive a second hydraulic pump which imparts an increase of the hydraulic pressure within the aircraft hydraulic system. The increase in hydraulic pressure within the aircraft hydraulic system drives a second hydraulic motor which drives an electric generator which simultaneously slows the aircraft and charges the aircraft battery.

8 Claims, 3 Drawing Sheets

TAXI AND TAKEOFF MODE

(56) References Cited

U.S. PATENT DOCUMENTS

2013/0087654 A1* 4/2013 Seibt .................... B60T 1/10
                                                        244/50
2015/0253773 A1* 9/2015 Cox ................. G05D 1/0083
                                                        701/3

* cited by examiner

TAXI AND TAKEOFF MODE

LANDING AND BRAKING MODE

ELECTRIC HYDRAULIC MOTOR SYSTEM FOR AIRCRAFT

This application is based upon and claims the priority filing date of the previously filed, U.S. Provisional patent application entitled "ELECTRIC HYDRAULIC MOTOR SYSTEM FOR LIGHT AND HEAVY AIRCRAFT" filed Mar. 24, 2014, Ser. No. 61/969,413, the entire disclosure of which is hereby incorporated herein by reference.

BACKGROUND

The present invention pertains to an electric hydraulic motor system for providing forward, backward movement and braking during taxiing of an aircraft, take-off and landing—replacing the need for an auxiliary unit and reducing the number of breaks.

Aircraft taxiing is the movement of an aircraft on the ground, under its own power, in contrast to towing or push-back where the aircraft is moved by a tug. The aircraft usually moves on wheels, but the term also includes aircraft with skis or floats for water based travel.

Normally, the thrust to propel the aircraft forward comes from its propellers or jet engines. Typical aircraft can spend a significant amount of time taxiing requiring a significant amount of fuel and causes high levels of emissions and noise pollution.

The present invention provides a system for reducing these problems. The difficulties inherent in the art are therefore overcome in a way which is simple, useful, and efficient—which will provide better and more advantageous results by reducing aircraft fuel consumption, emissions, and noise pollution.

SUMMARY

For the foregoing reasons, what is needed is an electric hydraulic motor system for providing braking and propulsion to an aircraft without the assistance of the aircraft primary engine.

In a version of the invention, the aircraft system comprises a battery; an electric motor and an electric generator, both the electric motor and the electric generator are operatively connected to the battery of the aircraft. The version further comprises a hydraulic system of the aircraft; a first hydraulic pump operatively connected to each the electric motor and the hydraulic system of the aircraft; and a first hydraulic motor operatively connected to each wheel of the aircraft and the hydraulic system of the aircraft. A second hydraulic motor is provided and operatively connects to each the electric generator and the hydraulic system of the aircraft; and a second hydraulic pump is provided operatively connected to each wheel of the aircraft and the hydraulic system of the aircraft.

The version has two modes of operation—the first a taxiing and takeoff mode wherein in taxiing and takeoff mode the battery storage of the aircraft provide electricity to drive the electric motor which drives the hydraulic pump which creates hydraulic pressure to actuate the first hydraulic motor in order to drive the wheels of the aircraft.

The second mode of operation is a braking mode—wherein in braking mode the rotation of the wheels of the aircraft drive the second hydraulic pump which creates hydraulic pressure to drive the second hydraulic motor which drives the electric generator which simultaneously slows the aircraft and charges the battery.

In another version of the invention, the hydraulic system of the aircraft comprises a hydraulic accumulator, wherein in the braking mode, while landing, the hydraulic accumulator stores hydraulic pressure created by the hydraulic pumps during landing to effectively store the increased energy associated with an abrupt rotation of the wheels of the aircraft during landing.

In another version of the invention, the electric hydraulic motor system further utilizes a hydrogen fuel cell in order to provide a source of energy. The electric motor is operatively connected to the battery and hydrogen fuel cell of the aircraft. In the version, while in taxiing and takeoff mode, the battery storage and hydrogen fuel cells provide electricity to drive the electric motor which drives the hydraulic pump which creates hydraulic pressure to actuate the first hydraulic motor in order to drive the wheels of the aircraft.

In other versions of the invention suited for heavy aircraft, an auxiliary power unit can be utilized in conjunction with the battery and/or hydrogen fuel cell in combination in order to provide electricity to the system. Moreover, the auxiliary power unit can be configured to charge the aircraft battery and directly provide hydraulic pressure to the hydraulic system of the aircraft.

The system can be configured to carry out both modes of operation or configured to provide only one of the modes of operation.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
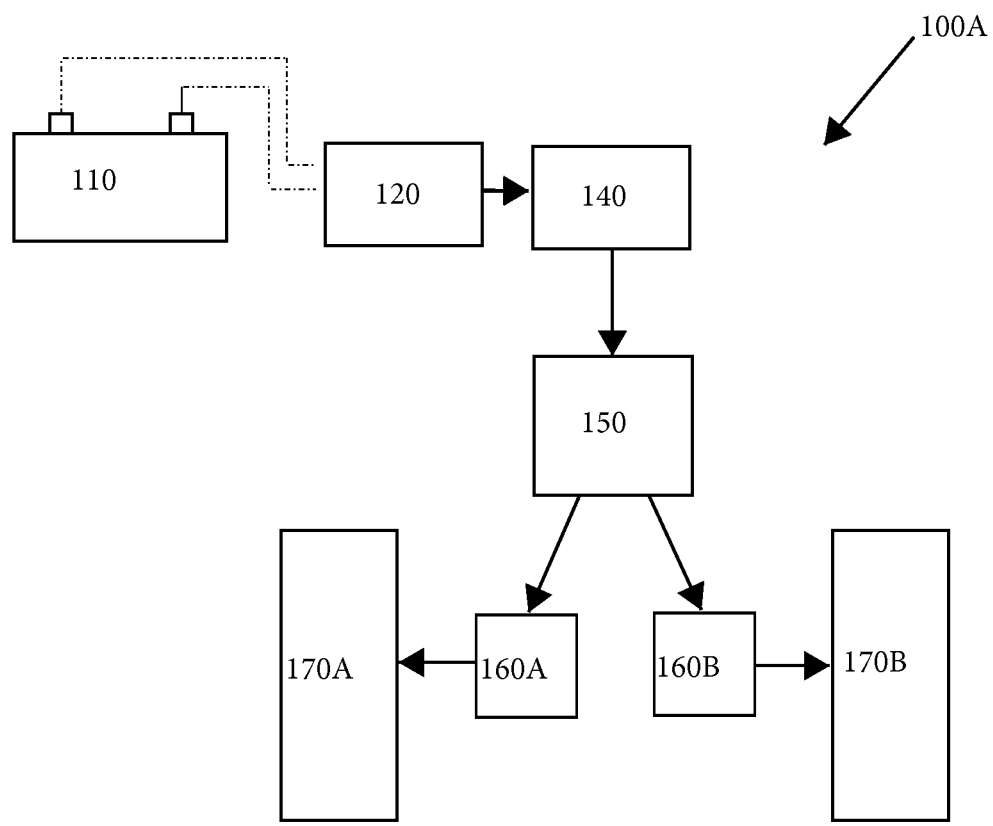
FIG. 1 is a schematic view of a version of the system of the present invention while in the taxiing and takeoff mode.

Referring now to the drawings wherein the showings are only for purposes of illustrating a preferred version of the invention and not for purposes of limiting the same.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

Figure 2:
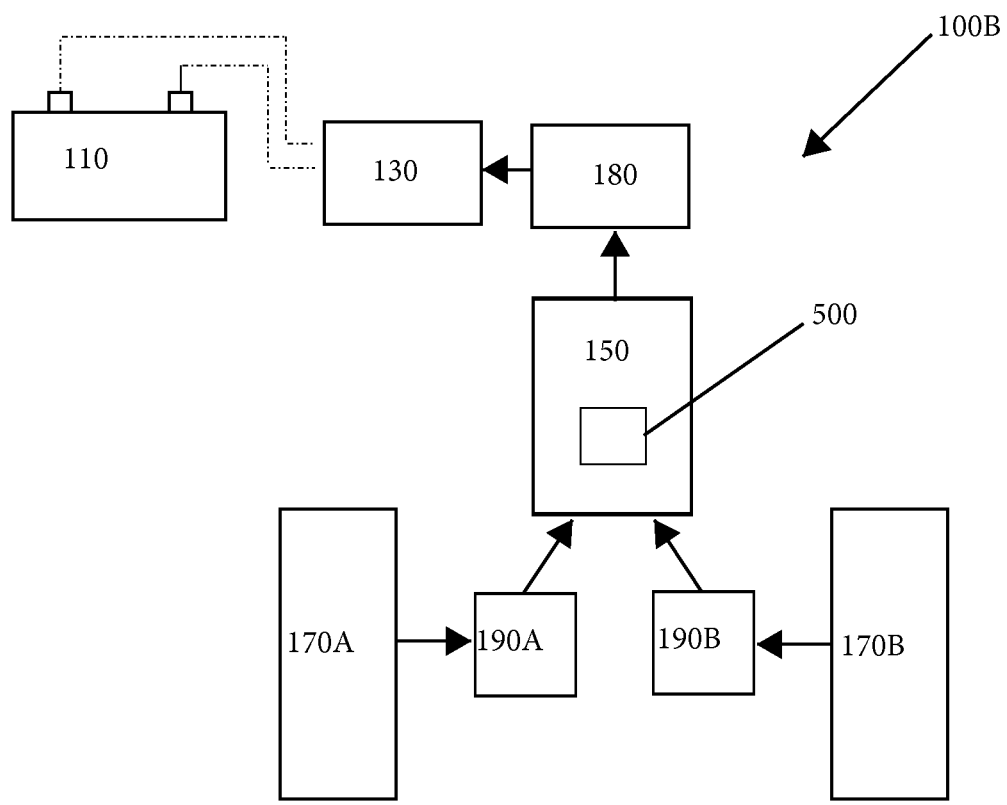
FIG. 2 is a schematic view of a version of the system of the present invention while in the landing and braking mode.

With reference now to FIG. 1 and FIG. 2, a new electric hydraulic motor system for aircraft is provided which embodies the concepts of the present invention and generally designated by the reference numeral 100A (taxi and takeoff mode) and 100B (braking and landing mode).

FIG. 1 and FIG. 2 are schematic views of the system while in the taxiing and takeoff mode and the braking mode respectively. The system comprises a battery 110, an electric motor 120 and an electric generator 130, both the electric motor 120 and the electric generator 130 are operatively connected to the battery 110 of the aircraft. The system includes a hydraulic system 150 of the aircraft as currently known in the art relating to hydraulic machinery and a first hydraulic pump 140. The first hydraulic pump 140 is operatively connected to each the electric motor 120 and the hydraulic system 150 of the aircraft. A first hydraulic motor 160A and 160B is provided which is operatively connected to each corresponding wheel 170A and 170B of the aircraft and the hydraulic system 150 of the aircraft. A second hydraulic motor 180 is provided that is operatively connected to each the electric generator 130 and the hydraulic system 150 of the aircraft. Wheel driven second hydraulic pumps 190A and 190B are operatively connected to the wheels 170A and 170B of the aircraft and the hydraulic system 150.

The version 100 has two modes of operation—the first a taxiing and takeoff mode 100A as depicted by FIG. 1 and a landing and braking mode 100B as depicted by FIG. 2. During the taxiing and takeoff mode, the electric hydraulic motor system 100A provides rotation of the aircraft wheels 170A and 170B imparting movement of the aircraft. In particular, the battery 110 provides electricity to drive the electric motor 120 which drives the hydraulic pump 140 which increases hydraulic pressure within the hydraulic system 150. The increase in hydraulic pressure is applied to actuate each first hydraulic motor 160A and 160B which creates a torque action driving the corresponding wheels 170A and 170B of the aircraft.

The second mode of operation is the landing and braking mode 100B which is depicted by FIG. 2. During the landing and braking mode, the electric hydraulic motor system imparts a braking action to the aircraft while simultaneously charging the aircraft battery 110. Preferably, the battery is a chargeable battery storage as known in the art of batteries. A single battery unite can be utilized or a series of multiple batteries can be utilized for storage and a source of power. In particular, the wheels 170A and 170B of the aircraft, drive the wheel driven second hydraulic pumps 190A and 190B which creates hydraulic pressure within the hydraulic system 150 to drive the second hydraulic motor 180 which drives the electric generator 130 which simultaneously slows the aircraft and charges the battery 110.

The system 100 can be configured to carry out both modes of operation or configured to provide only one of the modes of operation as described above.

As depicted in FIG. 2, the electric hydraulic motor system may also include a hydraulic accumulator 500. The hydraulic accumulator 500 stores hydraulic pressure created by the hydraulic pumps 190A and 190B during landing to enable the hydraulic system 150 to effectively store the increased energy associated with an abrupt rotation of the wheels 170A and 170B of the aircraft during landing.

Figure 3:
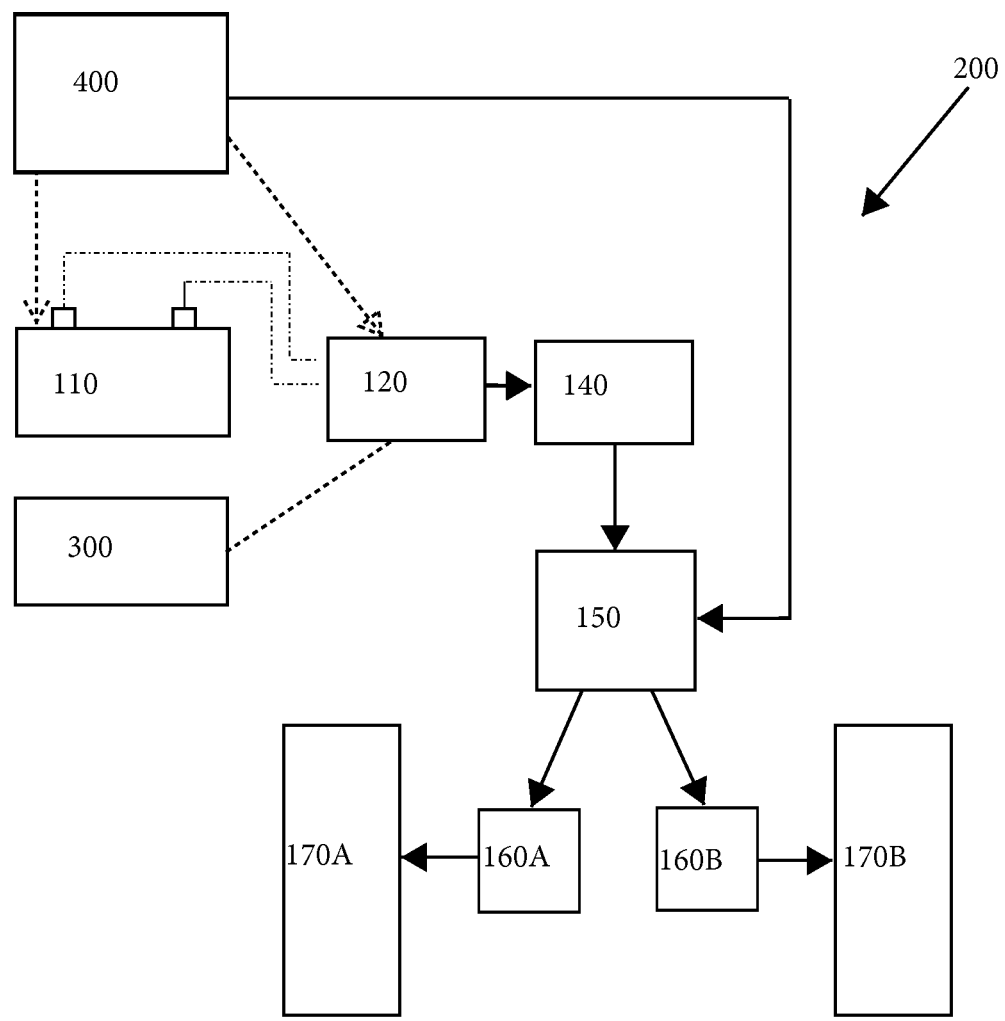
FIG. 3 is a schematic view of a version of the system of the present invention detailing the use of an optional hydrogen fuel cell and auxiliary power unit as a source of power.

Referring to FIG. 3, an alternative electric hydraulic motor system 200 is illustrated. In the version 200, alternative power sources may be utilized, during the taxiing and takeoff mode, in place of or in conjunction with the battery 110. As shown in FIG. 3, the hydraulic motor system may further comprise the use of a hydrogen fuel cell 300 and/or auxiliary power unit 400 which are operatively connected to the electric motor 120.

The hydrogen fuel cell 300 combines hydrogen and oxygen to produce electricity which drives or assists in driving the electric motor 120 of the electric hydraulic motor system 200 during the taxiing and takeoff mode. The electric motor 120 drives the hydraulic pump 140 which creates hydraulic pressure within the hydraulic system 150, which actuates the first hydraulic motors 160A and 160B in order to drive the wheels corresponding wheels 170A and 170B of the aircraft.

In other versions of the invention suited for heavy aircraft, an auxiliary power unit 400 can be utilized by itself or in combination with the battery 110 and/or hydrogen fuel cell 300 in order to provide electricity to the electric hydraulic motor system 200 while in the takeoff and landing mode. Moreover, the auxiliary power unit 400 can be operatively connected to and configured to charge the aircraft battery 110 as shown in FIG. 3. Additionally, the auxiliary power unit 400 may be operative configured to directly provide hydraulic pressure to the hydraulic system 150 of the aircraft as shown in FIG. 3. Thus, while in taxiing and takeoff mode the auxiliary power unit 400 of the aircraft provides additional hydraulic pressure to the hydraulic system 150 which imparts hydraulic pressure to actuate the first hydraulic motors 160A and 160B in order to drive the wheels 170A and 170B of the aircraft. Thereby, bypassing the need to provide electricity to the electric motor 120 and first hydraulic pump 140.

The disclosures of the following U.S. Patents are incorporated in their entirety by reference herein: U.S. Pat. No. 5,415,603; U.S. Pat. No. 7,237,634; U.S. Pat. No. 6,644,427; U.S. Pat. No. 8,079,437; U.S. Pat. No. 4,593,779; U.S. Pat. No. 6,330,498; U.S. Pat. No. 8,118,253; U.S. Pat. No. 8,016,228; and U.S. Pat. No. 4,759,178.

The previously described versions of the present invention have many advantages, including providing a system that is economical, reduces the need for fossil fuels and lowers emissions and noise pollution.

Although preferred versions of the invention have been described in considerable detail, other versions of the invention are possible.

All the features disclosed in this specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. An electric hydraulic motor system for aircraft having wheels, comprising:
   (a) a battery;
   (b) an electric motor and an electric generator, both the electric motor and the electric generator are operatively connected to the battery of the aircraft;
   (c) a hydraulic system of the aircraft;
   (d) a first hydraulic pump operatively connected to each the electric motor and the hydraulic system of the aircraft;
   (e) a first hydraulic motor operatively connected to each wheel of the aircraft and the hydraulic system of the aircraft;
   (f) a second hydraulic motor operatively connected to each the electric generator and the hydraulic system of the aircraft; and
   (g) a second hydraulic pump operatively connected to each wheel of the aircraft, and the hydraulic system of the aircraft;
   wherein in taxiing and takeoff mode the battery of the aircraft provides electricity to drive the electric motor which drives the hydraulic pump which creates hydraulic pressure within the hydraulic system to actuate the first hydraulic motor in order to drive the wheels of the aircraft; and wherein in braking mode the rotation of the wheels of the aircraft drive the second hydraulic pump which creates hydraulic pressure to drive the second hydraulic motor which drives the electric generator which simultaneously slows the aircraft and charges the battery.

2. The electric hydraulic motor system of claim 1, wherein the hydraulic system of the aircraft comprises a hydraulic accumulator, wherein in the braking mode, while landing, the hydraulic accumulator stores hydraulic pressure created by the hydraulic pump during landing to effectively store the increased energy associated with an abrupt rotation of the wheels of the aircraft during landing.

3. The electric hydraulic motor system of claim 1, further comprising a hydrogen fuel cell; wherein the electric motor is operatively connected the battery and the hydrogen fuel cell of the aircraft; and wherein in taxiing and takeoff mode the battery and hydrogen fuel cells provide electricity to drive the electric motor which drives the hydraulic pump which creates hydraulic pressure within the hydraulic system to actuate the first hydraulic motor in order to drive the wheels of the aircraft.

4. The electric hydraulic motor system of claim 3, further comprising an auxiliary power unit; wherein the electric motor is operatively connected to the battery, hydrogen fuel cell and the auxiliary power unit of the aircraft; and wherein in taxiing and takeoff mode the battery, hydrogen fuel cell and auxiliary power unit of the aircraft provide electricity to drive the electric motor which drives the hydraulic pump which creates hydraulic pressure within the hydraulic system to actuate the first hydraulic motor in order to drive the wheels of the aircraft.

5. The electric hydraulic motor system of claim 4, wherein the auxiliary power unit is operatively connected to the hydraulic system of the aircraft; and wherein in taxiing and takeoff mode the auxiliary power unit of the aircraft provides additional hydraulic pressure to the hydraulic system which imparts hydraulic pressure to actuate the first hydraulic motor in order to drive the wheels of the aircraft.

6. The electric hydraulic motor system of claim 1, further comprising an auxiliary power unit; wherein the electric motor is operatively connected to the battery and the auxiliary power unit of the aircraft; and wherein in taxiing and takeoff mode the battery and auxiliary power unit of the aircraft provide electricity to drive the electric motor which drives the hydraulic pump which creates hydraulic pressure within the hydraulic system to actuate the first hydraulic motor in order to drive the wheels of the aircraft.

7. The electric hydraulic motor system of claim 1, further comprising an auxiliary power unit; wherein the auxiliary power unit is operatively connected to the hydraulic system of the aircraft; and wherein in taxiing and takeoff mode the auxiliary power unit of the aircraft provides hydraulic pressure to the hydraulic system which imparts hydraulic pressure to actuate the first hydraulic motor in order to drive the wheels of the aircraft.

8. The electric hydraulic motor system of claim 1, wherein the hydraulic system of the aircraft comprises a hydraulic accumulator, wherein in the braking mode, while landing, the hydraulic accumulator stores hydraulic pressure created by the hydraulic pump during landing to effectively store the increased energy associated with an abrupt rotation of the wheels of the aircraft during landing.

\* \* \* \* \*